(12) United States Patent
Likhterov

(10) Patent No.: US 8,040,174 B2
(45) Date of Patent: Oct. 18, 2011

(54) CHARGE COUPLED PUMP-EFFICIENT CHARGE PUMP REGULATOR WITH MOS CAPACITOR

(75) Inventor: Boris Likhterov, Beer-Sheva (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 12/142,179

(22) Filed: Jun. 19, 2008

(65) Prior Publication Data

US 2009/0315615 A1    Dec. 24, 2009

(51) Int. Cl.
    *G05F 3/02*  (2006.01)
(52) U.S. Cl. ............... 327/536; 327/534; 327/59
(58) Field of Classification Search .......... 327/534–537, 327/59–62
    See application file for complete search history.

(56) References Cited

U.S. PATENT DOCUMENTS

| | | | |
|---|---|---|---|
| 4,249,194 A | 2/1981 | Rogers | |
| 4,429,285 A | 1/1984 | Bradshaw | |
| 5,060,110 A * | 10/1991 | Kane | 361/311 |
| 5,604,466 A | 2/1997 | Dreps | |
| 5,946,259 A | 8/1999 | Manning | |
| 5,962,887 A | 10/1999 | Manning | |
| 6,166,585 A | 12/2000 | Bazzani | |
| 6,366,519 B1 | 4/2002 | Hung | |
| 6,396,137 B1 | 5/2002 | Klughart | |
| 7,088,082 B2 | 8/2006 | Jung | |
| 7,132,878 B2 | 11/2006 | Chen | |
| 7,190,211 B2 | 3/2007 | Nakagawa | |
| 7,199,651 B2 | 4/2007 | Azimi | |
| 7,215,003 B2 | 5/2007 | Tanaka | |
| 7,257,009 B2 | 8/2007 | Negoi | |
| 2005/0201025 A1* | 9/2005 | Shau | 361/15 |
| 2005/0213280 A1* | 9/2005 | Azrai et al. | 361/271 |
| 2008/0088179 A1* | 4/2008 | Oyama et al. | 307/28 |
| 2008/0150619 A1* | 6/2008 | Lesso et al. | 327/536 |

OTHER PUBLICATIONS

Van Zeghbroeck, BarL V., "Principles of Semiconductor Devices," ch.6, MOB Capacitors, Univ. of Colorado at Boulder, 2007. Available at: http://ece-www.colorado.edul-bardbook/book/chapter6/ch6_3.htm.*

(Continued)

*Primary Examiner* — Lincoln Donovan
*Assistant Examiner* — Shikha Goyal
(74) *Attorney, Agent, or Firm* — Vierra Magen Marcus & DeNiro LLP

(57) ABSTRACT

A charge pump with a MOS-type capacitor, where the MOS-type capacitor is operated in an inversion region in which capacitance varies as a function of the frequency of the applied signal. The charge pump is switched to transfer charge from an input node to the capacitor and from the capacitor to an output node. During a transition interval, a relatively high frequency switching signal is used to lower the capacitance and increase efficiency. During a settling interval, a relatively low frequency switching signal is used, in which case the capacitance is higher, but similar to a level which would be seen if the capacitor was operated in an accumulation region. MOS capacitor dimensions and switching intervals are mutually optimized to provide high efficiency and required throughput. The charge pump may be configured as a voltage multiplier, divider, inverter or follower, for instance.

21 Claims, 10 Drawing Sheets

OTHER PUBLICATIONS

Van Zeghbroeck, Bart V., "Principles of Semiconductor Devices," ch.6, MOS Capacitors, Univ. of Colorado at Boulder, 2007. Available at: http://ece-www.colorado.edu/~bart/book/book/chapter6/ch6_3.htm.

McKee, R.A., "Physical Structure and Inversion Charge at a Semiconductor Interface with a Crystalline Oxide," Science Jul. 20, 2001, vol. 293. No. 5529, pp. 468-471.

Pylarinos, L, "Charge Pumps: An Overview," Dept. Electr. Comput. Eng., Univ. Toronto, ON, Canada, (2001). Available at: http://www.eecg.toronto.edu/kphang/ece1371/chargepumps.pdf.

MAX1759 Data Sheet, Maxim Integrated Products, Sunnyvale, CA, 2000. Available at: http://datasheets.maxim-ic.com/en/ds/MAX1759.pdf.

* cited by examiner

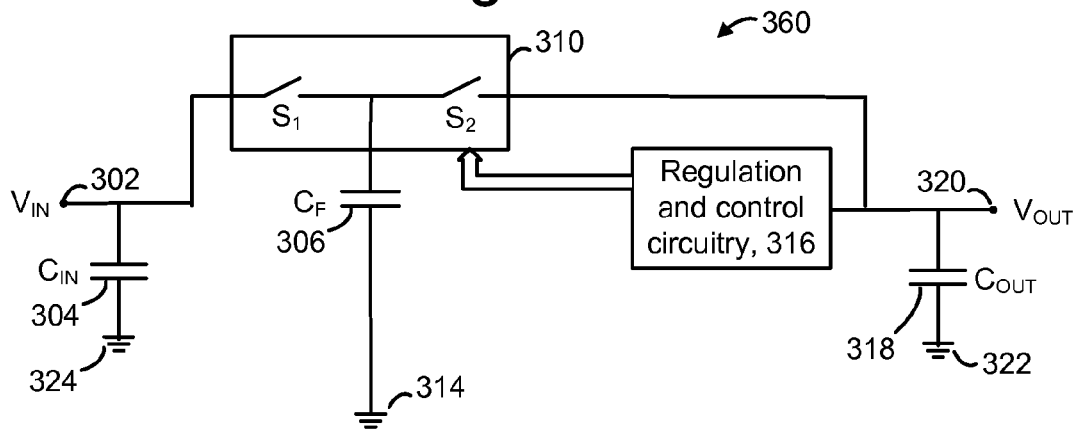
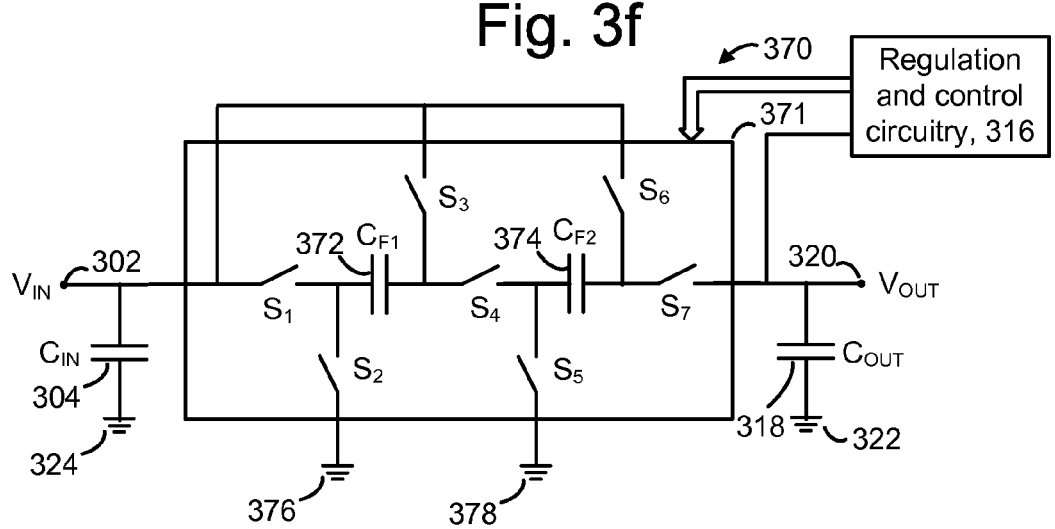
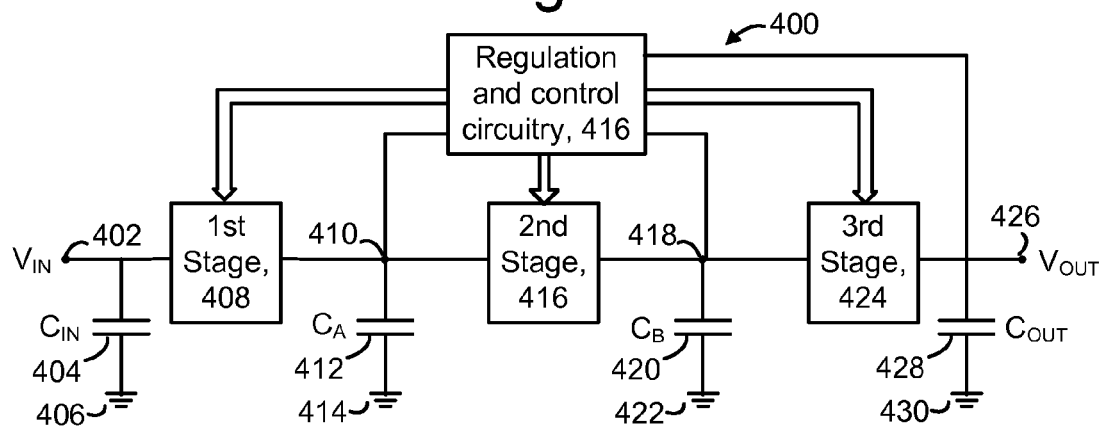

US 8,040,174 B2

CHARGE COUPLED PUMP-EFFICIENT CHARGE PUMP REGULATOR WITH MOS CAPACITOR

BACKGROUND OF THE INVENTION

1. Field of the Invention

The present invention relates to a charge pump.

2. Description of the Related Art

Electronic devices often require regulated voltages in order to operate properly. Typically, a supply voltage of the device is provided to a voltage regulator which can translate the voltage to an output voltage at different levels. Various types of voltage regulators can be used. For example, linear regulators provide a relatively noise free output and can be lower in cost, but are less efficient and unable to step-up or invert the input voltage. Switching regulators can be higher in cost but have greater efficiency and can provide step-up and inversion features. Switching regulators rapidly switch an energy storage device such as an inductor or capacitor on and off. A charge pump, or voltage converter, provides an output voltage which is different from the supply voltage. A charge pump typically uses capacitors as energy storage elements to provide an output voltage which is higher or lower than the input voltage. Moreover, a charge pump can include voltage regulation circuitry to maintain the output voltage at a constant level also in the case when the input voltage varies within a range. However, a charge pump usually suffers from efficiency degradation when operated at a point which is not close to its native input to output voltage ratio.

SUMMARY OF THE INVENTION

The present invention provides a method for efficiently operating a charge pump regulator with a MOS capacitor.

In one embodiment, a method for operating a charge pump includes applying a voltage to an input node of the charge pump. The charge pump includes at least one capacitor having an insulating layer between first and second conductive layers. The method further includes alternately transferring charge from the input node to the at least one capacitor, and from the at least one capacitor to an output node of the charge pump, while operating the at least one capacitor in an inversion region.

In another embodiment, a method for operating a charge pump includes applying a voltage to an input node of the charge pump. The charge pump includes at least one capacitor having an insulating layer between first and second conductive layers. The method further includes alternately transferring charge from the input node to the at least one capacitor, and from the at least one capacitor to an output node of the charge pump, while operating the at least one capacitor in a region in which a capacitance of the at least one capacitor varies with a frequency of an input signal to the at least one capacitor.

In another embodiment, a method is provided for operating a multi-stage charge pump which includes at least first and second stages. The method includes applying a voltage to an input node of the first stage, where the first stage includes at least one capacitor. The method further includes operating the at least one capacitor of the first stage in an inversion region while transferring charge from the input node of the first stage to the at least one MOS capacitor of the first stage, and from the at least one capacitor of the first stage to an input node of the second stage. The second stage includes at least one capacitor. The method further includes operating the at least one capacitor of the second stage in the inversion region while transferring charge from the input node of the second stage to the at least one capacitor of the second stage, and from the at least one capacitor of the second stage to an output node of the second stage.

In another embodiment, a charge pump includes an input node, an output node, and a capacitor which operates in an inversion state, where the capacitor includes an insulating layer between first and second conductive layers. The charge pump further includes at least a first set of switches coupled to the first conductive layer, at least a second set of switches coupled to the second conductive layer, and a control circuit which applies control signals to the at least a first set of switches and the at least a second set of switches to alternately transfer charge from the input node to the capacitor and from the capacitor to the output node.

Corresponding methods, systems and computer- or processor-readable storage devices for performing the methods provided herein may be provided.

BRIEF DESCRIPTION OF THE DRAWINGS

FIG. 3e depicts a charge pump configured as a follower.

FIG. 3f depicts a single-stage, multi-capacitor charge pump.

FIG. 4 depicts a multi-stage charge pump.

DETAILED DESCRIPTION

The present invention provides a method for efficiently operating a charge pump regulator with a MOS capacitor.

Figure 1:
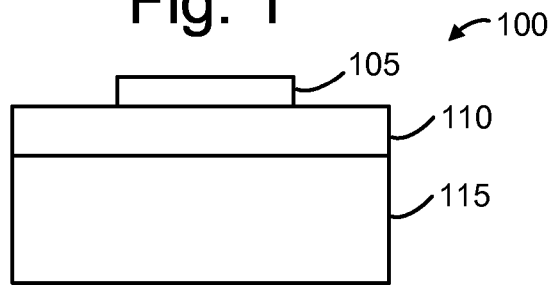
FIG. 1 depicts a MOS capacitor.

FIG. 1 depicts a MOS (metal oxide semiconductor) capacitor 100, also referred to as a MOSCAP. The capacitor 100 can be formed by depositing a layer of metallic conductive material 105 onto a layer of oxide 110 that has been deposited or grown on a layer of semiconductor material 115, such as a semiconductor wafer, referred to as the body. The semiconductor material 115 may be p-type or n-type, based on the polarity of the body, in which case the MOSCAP is referred to as being p-type or n-type, respectively. The MOSCAP is an example of a type of capacitor which includes an insulator layer between two conducting layers. Older MOSCAP designs used a metal such as aluminum for the top conducting layer. More recently, the top conductive layer has been formed from a material such as n+ or p+ polysilicon, which is conductive, although it is not a metal. For historical reasons, the term "MOS" or "MOSCAP" has encompassed such nonmetal materials. The top conducting layer may be considered to be a gate terminal, while the bottom conducting layer is a source, drain or bulk terminal. In one approach, a MOSCAP can be formed from a MOSFET by tying its drain, source and bulk terminal together and using the resulting device as a two-terminal device.

To be used as flying capacitor, the technology should provide an opportunity to connect the bulk terminal of the MOSCAP to a voltage different from that of a substrate. For standard digital technology (p-type substrate, no triple-well) an nMOS capacitor can be used, while for an n-type substrate, an pMOS capacitor can be used. For triple-well technology, any type can be used. For the follower configuration, one terminal is always grounded, so a pMOS or nMOS capacitor can be used.

Figure 2A:
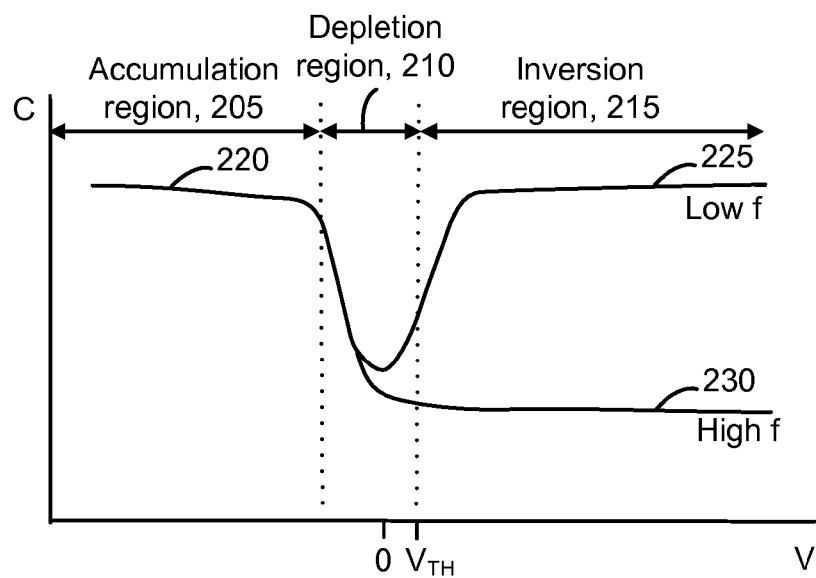
FIG. 2a depicts a capacitance versus voltage curve for a p-type MOS capacitor.

FIG. 2a depicts a capacitance versus voltage curve for a p-type MOS capacitor. This and other graphs are not necessarily to scale. A MOSCAP has a capacitance versus voltage (C-V) characteristic in which its capacitance varies as a function of the voltage across the capacitor, e.g., between the metal or polysilicon layer and the semiconductor material. In an accumulation region 205, majority carriers are pulled towards the gate and accumulate near the surface of the semiconductor material, adjacent to the insulating layer. For a p-type semiconductor material, holes accumulate near the surface of the semiconductor material. The capacitance remains relatively constant as depicted by curve 220. In a depletion region 210, the majority carriers are pushed away from the surface of the semiconductor material, creating a small concentration of the carriers and, consequently, a small capacitance. In an inversion region 215, majority carriers are actively pushed away from the insulator and minority carriers are generated and dominate near the surface of the semiconductor material so that the semiconductor surface charge is inverted (from positive to negative). The minority carriers do not respond to high frequency stimulus, so that divergence of high and low frequency characteristics occurs.

In particular, curve 225 depicts the low frequency characteristic while curve 230 depicts the high frequency characteristic. Curve 230 indicates that the capacitance is relatively constant at or near a minimum level when a high frequency input signal is applied to the capacitor. That is, capacitance is degraded at higher frequencies at a bias voltage above $V_{TH}$. Curve 225 indicates that the capacitance is relatively constant at or near a maximum level when a low frequency input signal is applied to the capacitor, after rising sharply with increasing voltage above the threshold voltage $V_{TH}$ of the capacitor. A low frequency generally refers to a frequency which is much less than $1/\tau$, e.g., less than $1/3\tau$ or $1/5\tau$, where $\tau$ is the time constant of the capacitor. A high frequency generally refers to a frequency which is much greater than $1/\tau$, e.g., more than $3\tau$, or $5\tau$. Capacitance is directly related to capacitor area W*L (width*length), while the time constant is directly related to the capacitor length L. Note that the capacitance in the accumulation region, depicted by curve 220, may be substantially equal to the low frequency capacitance in the inversion region, depicted by curve 225, at their respective steady state levels.

Figure 2B:
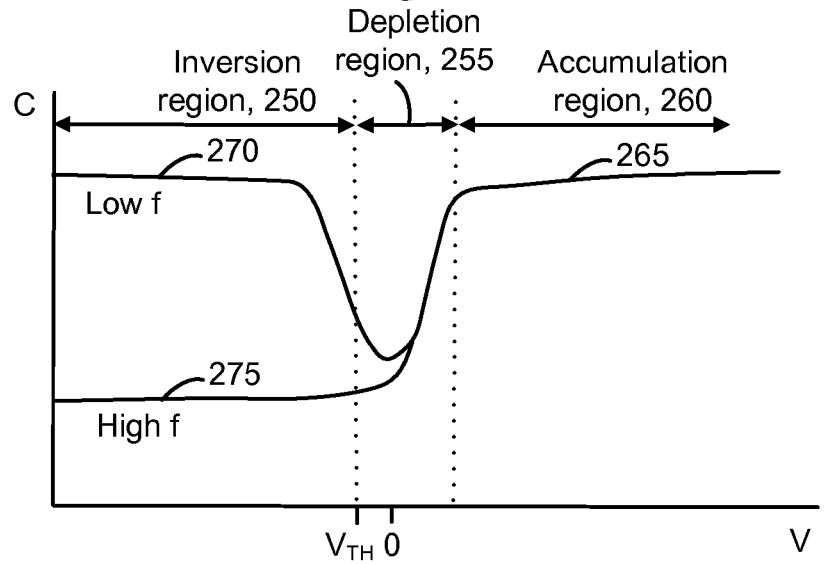
FIG. 2b depicts a capacitance versus voltage curve for an n-type MOS capacitor.

FIG. 2b depicts a capacitance versus voltage curve for an n-type MOS capacitor. The C-V characteristic of the n-type MOS capacitor is essentially a mirror image of the C-V characteristic of the p-type MOS capacitor described in connection with FIG. 2a. In particular, in an accumulation region 260, majority carriers, e.g., electrons, accumulate near the surface of the semiconductor material, adjacent to the insulating layer. The capacitance remains relatively constant as depicted by curve 265. In a depletion region 255, the majority carriers are lightly pushed away from the surface of the semiconductor material, created a region depleted from carriers, thus resulting in a low capacitance value. In an inversion region 250, additional minority carriers are generated and dominate near the surface of the semiconductor material so that the semiconductor surface charge is inverted (from negative to positive).

Curve 270 depicts the low frequency characteristic while curve 275 depicts the high frequency characteristic in the inversion region. Curve 275 indicates that the capacitance is relatively constant at or near a minimum level when a high frequency input signal is applied to the capacitor. That is, capacitance is degraded at higher frequencies at a bias voltage below $V_{TH}$. Curve 270 indicates that the capacitance is relatively constant at or near a maximum level when a low frequency input signal is applied to the capacitor, after rising sharply with decreasing voltage below the threshold voltage $V_{TH}$ of the capacitor.

A capacitor can be operated in a desired region by applying appropriate voltages across the capacitor. For example, when a capacitor in a charge pump is repeatedly charged by an input voltage and discharged to provide an output voltage, switches which allow the charging and discharging can be controlled appropriately, as discussed further below.

Figure 3A:
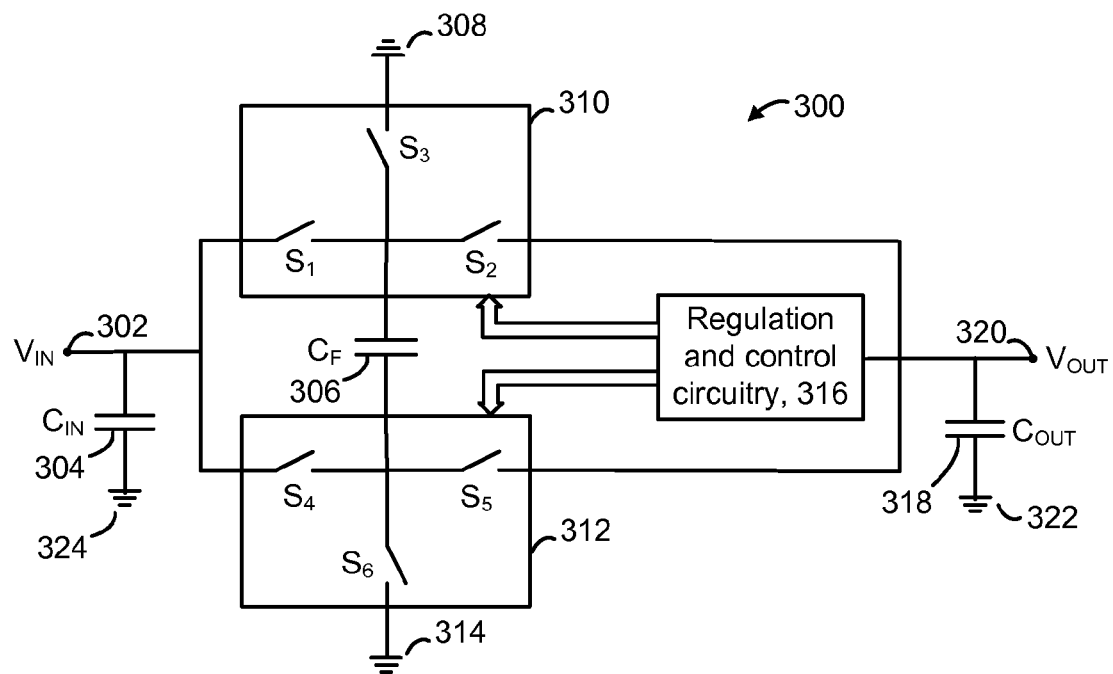
FIG. 3a depicts a single-stage charge pump.

FIG. 3a depicts a single-stage charge pump with a single flying capacitor. A charge pump generally refers to a switching voltage converter that employs an intermediate capacitive storage element which is sometimes referred to as a flying capacitor or a charge transfer capacitor. One or more flying capacitors can be used. Moreover, a charge pump can include multiple stages connected in series to obtain special features such as a high output voltage and a greater range of output voltages. A charge pump can be constructed or configured for providing voltage conversion for applications including: multiplier, divider, inverter and follower. The principles discussed herein can be applied to one or more stages, and to one or more capacitors in a stage. The charge pump 300 is a generalized embodiment which can be controlled for multiplier, divider, inverter and follower applications. The charge pump 300 includes an input node 302 at which a voltage $V_{IN}$ is applied. For example, $V_{IN}$ may be a fixed power supply voltage sometimes referred to as $V_{DD}$ in a semiconductor chip. Charge from the voltage is maintained in an input capacitor $C_{IN}$ 304 which is connected to a ground node 324.

A first set of switches 310 and a second set of switches 312 are controlled by regulation and control circuitry 316 to transfer charge from the input node 302 to a flying capacitor $C_F$ 306, and from $C_F$ 306 to an output node 320. $V_{OUT}$ is a resulting voltage at the output node 320, and can be greater than or less than $V_{IN}$. The output node is coupled to an output capacitor $C_{OUT}$ 318, which is connected to a ground node 322. The first set of switches 310 includes switches $S_1$, $S_2$ and $S_3$ which are star-connected to one terminal (such as the top conductor) of $C_F$. The switches may be MOSFETs, BJTs, relay switches, or the like. $S_1$ connects the top conductor of $C_F$ to the input node 302 to receive a charge from $V_{IN}$. $S_2$ connects the top conductor of $C_F$ to the output node 320 to transfer its charge to the output node. $S_3$ connects the top conductor of $C_F$ to a ground node 308. Similarly, the second set of switches 312 includes switches $S_4$, $S_5$ and $S_6$ which are star-connected to another terminal (such as the bottom conductor) of $C_F$. $S_4$ connects the bottom conductor of $C_F$ to the input node 302 to receive a charge from $V_{IN}$. $S_5$ connects the bottom conductor of $C_F$ to the output node 320 to transfer its charge to the output node. $S_6$ connects the bottom conductor of $C_F$ to a ground node 314.

Generally, the charge pump operation includes two main phases: charging $C_F$ from the input node, and discharging $C_F$ into the output node. During each phase, one of the switches in each set of switches is closed, connecting $C_F$ to either the input node, the output node, or a ground node. Further, the regulation and control circuitry 316 provides the switches with appropriate control signals, including frequency, phases, amplitudes, delays, etc., depending on the particular application. The regulation and control circuitry 316 may communicate with the output node 320 as well such as to detect its level. Note that the circuits shown are examples only, as various modifications can be made.

Figure 3B:
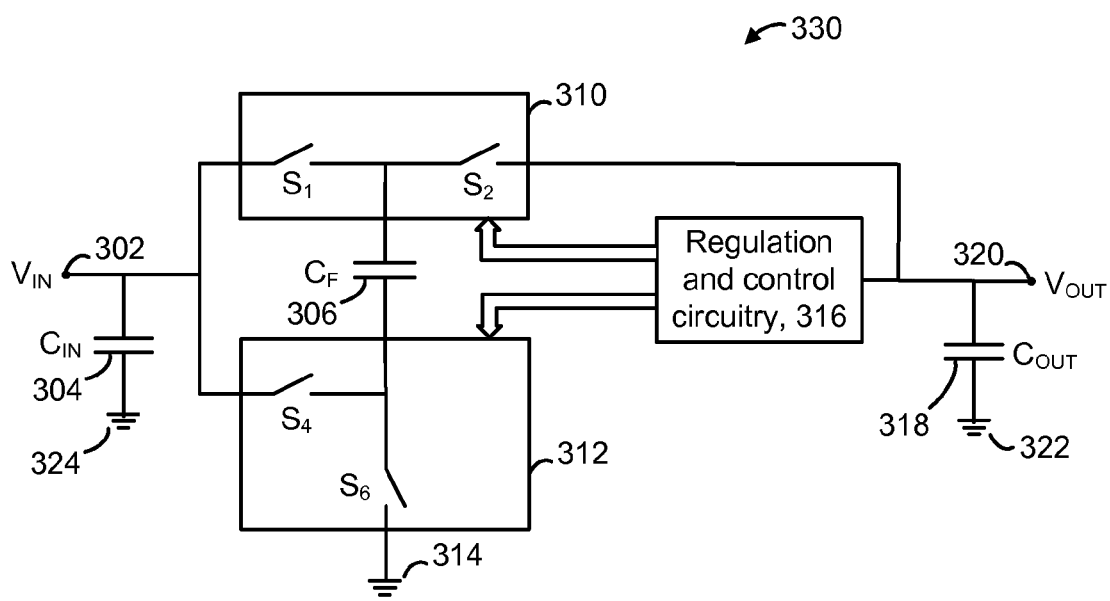
FIG. 3b depicts a charge pump configured as a voltage multiplier.

FIG. 3b depicts a charge pump 330 configured as a voltage multiplier. A voltage multiplier, or step-up charge pump, in general, provides $V_{OUT} > V_{IN}$. In this configuration, the voltage multiplier provides $2 \times V_{IN} > V_{OUT} > V_{IN}$, and the switches $S_3$ and $S_5$ of FIG. 3a are not needed. In a charging phase, the regulation and control circuitry 316 provides the switches with appropriate control signals so that $S_1$ is closed, e.g., conductive, and $S_2$ is open, e.g., non-conductive, so that $C_F$ is charged via $S_1$. Further, $S_4$ is open and $S_6$ is closed so that the bottom conductor of $C_F$ is connected to the ground node 314. In a discharging phase, $S_1$ is open and $S_2$ is closed, so that $C_F$ is discharged, at least in part, to the output node 320 via $S_2$. Further, $S_4$ is closed and $S_6$ is open.

Figure 3C:
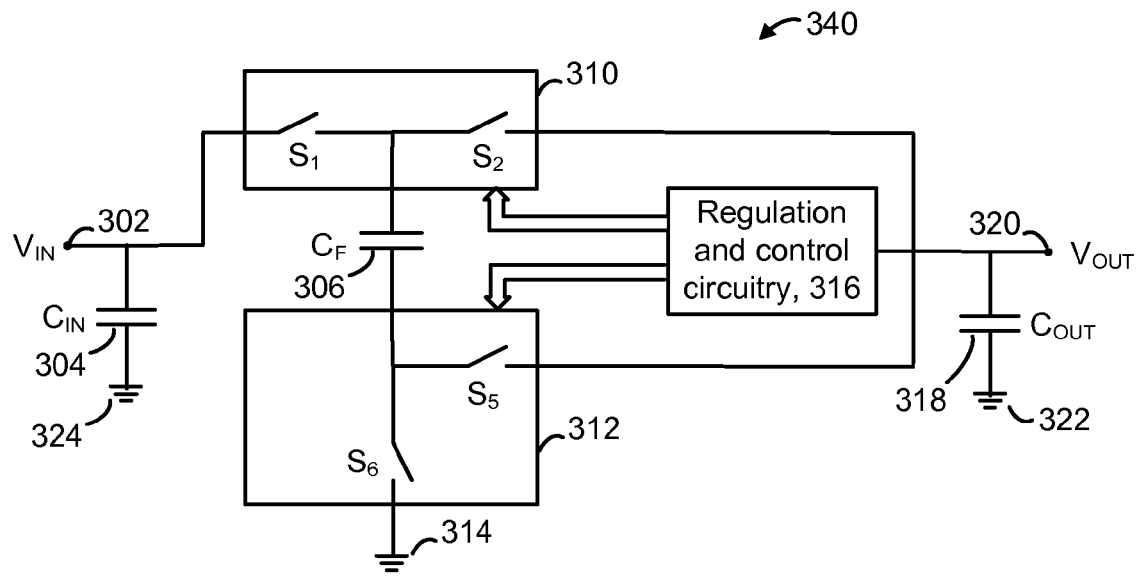
FIG. 3c depicts a charge pump configured as a voltage divider.

FIG. 3c depicts a charge pump 340 configured as a voltage divider. A voltage divider, or step-down charge pump, in general, provides $V_{OUT} < V_{IN}$. In this configuration, $V_{OUT} < V_{IN}/2$, and the switches $S_3$ and $S_4$ of FIG. 3a are not needed. In a charging phase, the regulation and control circuitry 316 provides the switches with appropriate control signals so that $S_1$ is closed and $S_2$ is open so that $C_F$ is charged via $S_1$. Further, $S_5$ is closed and $S_6$ is open so that the bottom conductor of $C_F$ is connected to the output node 320. In a discharging phase, $S_1$ is open and $S_2$ is closed, so that $C_F$ is discharged, at least in part, to the output node 320 via $S_2$. Further, $S_6$ is closed and $S_5$ is open so that the bottom conductor of $C_F$ is connected to the ground node 314.

Figure 3D:
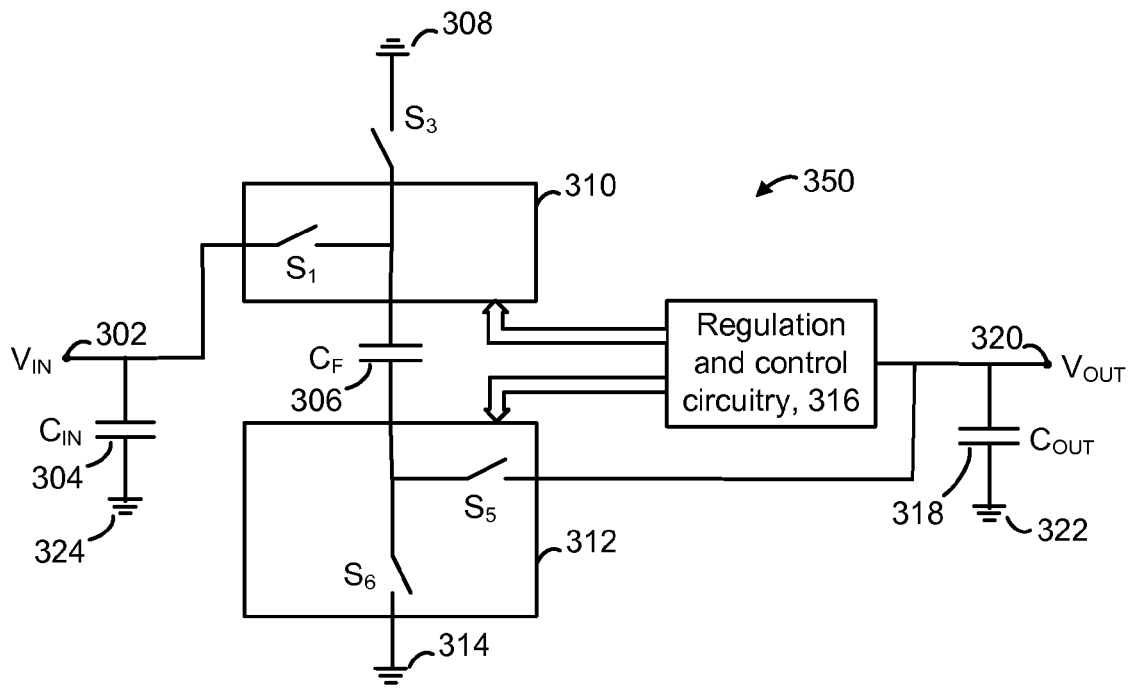
FIG. 3d depicts a charge pump configured as an inverter.

FIG. 3d depicts a charge pump 350 configured as an inverter. An inverter provides a voltage output with an opposite polarity to the voltage input, e.g., $V_{OUT} \approx -V_{IN}$, (where "$\approx$" denotes "approximately equal to"). In this configuration, the switches $S_2$ and $S_4$ of FIG. 3a are not needed. In a charging phase, the regulation and control circuitry 316 provides the switches with appropriate control signals so that $S_1$ is closed and $S_3$ is open, so that $C_F$ is charged via $S_1$. Further, $S_5$ is open and $S_6$ is closed so that the bottom conductor of $C_F$ is connected to the ground node 314. In a discharging phase, $S_1$ is open and $S_3$ is closed, so that the top conductor of $C_F$ is connected to the ground node 308 via $S_3$. Further, $S_5$ is closed and $S_6$ is open so that the bottom conductor of $C_F$ is connected to the output node 320, and $C_F$ is discharged, at least in part, to the output node 320 via $S_5$.

FIG. 3e depicts a charge pump 360 configured as a follower. A voltage follower provides $V_{OUT} \approx V_{IN}$. In this configuration, the switches $S_3$, $S_4$, $S_5$ and $S_6$ of FIG. 3a are not needed. The bottom conductor of $C_F$ 306 is constantly connected to the ground node 314. In a charging phase, the regulation and control circuitry 316 provides the switches with appropriate control signals so that $S_1$ is closed and $S_2$ is open, so that the top conductor of $C_F$ is connected to the input node 302 and $C_F$ is charged via $S_1$. In a discharging phase, $S_1$ is open and $S_2$ is closed, so that the top conductor of $C_F$ is connected to the output node 320 and $C_F$ discharges to the output node 320 via $S_2$.

FIG. 3f depicts a single-stage, multi-capacitor charge pump 370. In this example, multiple flying capacitors are provided in a single stage. While two capacitors are provided as an example, more than two may be used. There are many possible charge pump configurations with multiple flying capacitors. The charge pump 370 is configured as a voltage multiplier in which $V_{OUT} \approx 3 \times V_{IN}$. Capacitors $C_{F1}$ 372 and $C_{F2}$ 374 are provided. A set of switches 371 includes switches $S_1$ to $S_7$. $S_2$ and $S_5$ are connected to ground nodes 376 and 378, respectively. During a charging phase, switches $S_2$, $S_3$, $S_5$, and $S_6$ are closed, while $S_1$, $S_4$ and $S_7$ are open, so that both flying capacitors $C_{F1}$ and $C_{F2}$ are connected in parallel and charged to the input voltage. During a discharging phase, switches $S_1$, $S_4$ and $S_7$ are closed, and $S_2$, $S_3$, $S_5$ and $S_6$ are open, so that the flying capacitors are connected in series between the input node 302 and the output node 320. This effectively creates an output voltage of approximately three times the input voltage.

The use of multiple flying capacitors in a single stage can provide a ratio between $V_{OUT}$ and $V_{IN}$, e.g., $V_{OUT}=1.5 \times V_{IN}$, $3 \times V_{IN}$, etc., or $V_{OUT}=\frac{1}{2} \times V_{IN}$, $\frac{1}{3} \times V_{IN}$, etc. For greater flexibility, a multi-stage charge pump, such as described below, can be used.

FIG. 4 depicts a multi-stage charge pump 400. $V_{IN}$ is provided at input node 402 so that $V_{OUT}$ is obtained at an output node 426. As an example, three stages 408, 416 and 424 are provided. Two or more stages may be used. Each stage can include switches and one or more flying capacitors as discussed previously, for example. At the input, a capacitor $C_{IN}$ 404 is connected at one of its conductive layers to a ground node 406. At a node 410 which is between the first stage 408 and the second stage 416, a capacitor $C_A$ 412 is connected at one of its conductive layers to a ground node 414. At a node 418 which is between the second stage 416 and the third stage 424, a capacitor $C_B$ 420 is connected at one of its conductive layers to a ground node 422. Finally, at the output node 426, an output capacitor $C_{OUT}$ 428 is connected at one of its conductive layers to a ground node 430. A multi-stage charge pump can provide greater flexibility in terms of providing a greater range of output voltages. Further, each stage can include one or more capacitors to provide even greater flexibility.

The multi-stage charge pump 400 is operated under the control of regulation and control circuitry 416 which controls switching in each stage. Note that it is also possible to provide regulation and control circuitry in each stage, additionally or alternatively. Charge is transferred from the input node 402 of the first stage to a flying capacitor (not shown) in the first stage 408, and from the flying capacitor of the first stage to the node 410. Charge is then transferred from the node 410 of the second stage to a flying capacitor (not shown) in the second stage, and from the flying capacitor of the second stage to the node 418. Charge is then transferred from the node 418 to a flying capacitor (not shown) in the third stage, and from the flying capacitor of the third stage to the output node 426, assuming there are no further stages.

Figure 5A:
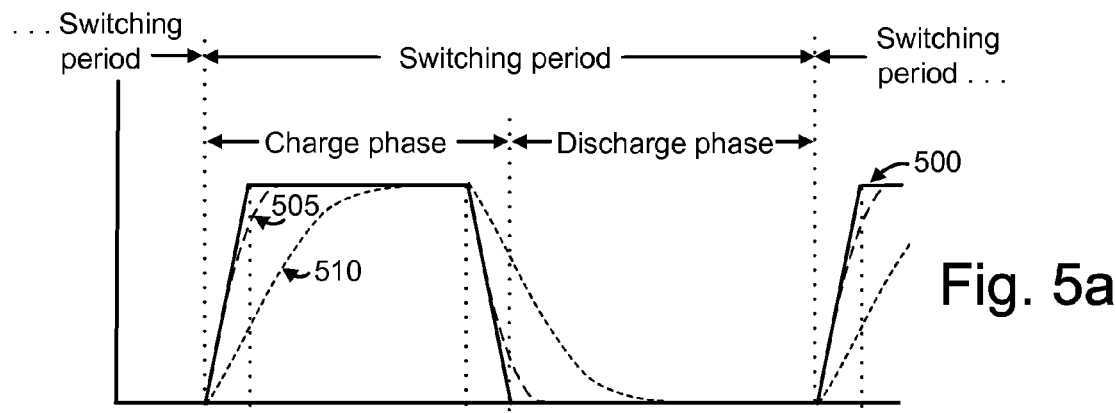
FIG. 5a depicts a control signal for switches responsible for charging a flying capacitor in a charge pump.

FIG. 5a depicts a control signal for switches responsible for charging a flying capacitor in a charge pump. As mentioned, regulation and control circuitry is used to provide switches in a charge pump with appropriate control signals, including frequency, phases, amplitudes, delays, etc., depending on the particular configuration. The control signals are set so that the one or more capacitors in the charge pump operate at desired operating points or zones in the inversion region. Specifically, the control signals can take advantage of the fact that a capacitor, such as a MOSCAP, is used which has a capacitance which varies with the frequency of the applied signal to the capacitor, as discussed in connection with FIGS. 2a and 2b. In particular, in the inversion regions 215 and 250 of FIG. 2a and 2b, respectively, the capacitance is at a minimum when the applied voltage across the capacitor is at a sufficiently high frequency, and the capacitance is at a maximum when the applied voltage across the capacitor is at a low frequency. By operating the capacitor at the different capacitance levels which are available in the inversion region, efficiency can be boosted. In comparison, operating the capacitor in the accumulation region does not provide this benefit. Generally, the capacitor undergoes repeated cycles of charging and discharging in order to transfer charge from the input node to the output node. Thus, the applied voltage across the capacitor varies during charging and discharging. Note that $V_{IN}$ may be substantially constant during the charging and discharging.

The waveform 500 spans one full switching period which includes a charge phase and a discharge phase. Portions of neighboring switching periods are also shown. The waveform is plotted on an x-y axis in which the x axis denotes time and the y-axis denotes control signal amplitude. As mentioned, the waveform is a representative waveform which is applied to one or more switches. A higher amplitude of the waveform causes a switch to conduct, which is equivalent to closing the switch, while a lower amplitude of the waveform causes a switch to not conduct, which is equivalent to opening the switch. For example, the waveform may be applied to the gate of a MOSFET switch, where the amplitude is sufficient to cause the switch to become conductive. In the voltage multiplier configuration of FIG. 3b, the waveform 500 may be applied to the switches which are closed in a charging phase, namely $S_1$ and $S_6$. Similarly, in the voltage divider configuration of FIG. 3c, the waveform 500 may be applied to $S_1$ and $S_5$, in the voltage inverter configuration of FIG. 3d, the waveform 500 may be applied to $S_1$ and $S_6$, and in the voltage follower configuration of FIG. 3e, the waveform 500 may be applied to $S_1$.

In this example, the waveform 500 is discussed in connection with its control of $S_1$, although it will be understood that it can be applied to other switches additionally or alternatively depending on the particular charge pump configuration. Referring still to FIG. 5a, the charge phase extends between t1 and t4, and includes a transition interval between t1 and t2 in which $S_1$ transitions from being opened to being closed (conductive) and charging of the capacitor begins, a settling interval between t2 and t3 in which $S_1$ remains closed and charging continues, and a transition interval between t3 and t4 in which $S_1$ transitions from being closed to being open (non-conductive) and charging ends. The capacitor may or may not reach a fully charged state at t3. Waveform 505 depicts a voltage applied to the capacitor and waveform 510 depicts a charge across the capacitor. Generally, the voltage rises quickly as the switch is closed while the charge increases more gradually. A normalized amplitude is provided for the waveforms 500, 505 and 510 to depict trends rather than absolute levels. During the settling interval t2-t3, the voltage change will be small but the change in charge, and the resulting current, will be considerable.

For example, at t3, the capacitor may be mostly charged, e.g., have accumulated a charge of more than about 50% of a difference between a fully charged steady state value and fully discharged steady state value, or almost fully charged, e.g., have accumulated a charge of more than about 70-90% of a difference between a fully charged steady state value ($V_{CHARGE}$) and fully discharged steady state value ($V_{DISCHARGE}$). The discharge phase extends between t4 and t7, and includes a settling interval between t5 and t6 in which $S_1$ is open and the capacitor discharges. Generally, the voltage falls quickly as the switch is opened (waveform 505) while the charge decreases more gradually (waveform 510). A portion of a next switching period is depicted starting at t7, and includes a transition interval between t7 and t8 in which $S_1$ is closing and charging begins again.

Most of the charge pump losses occur during the transition intervals, and are proportional to capacitance. The transition intervals are the shortest duration portions of the waveform 500, and therefore represent high frequency portions of the waveform. Moreover, as discussed, capacitance is lower when frequency is higher when a capacitor is in the inversion region (FIGS. 2a and 2b). Thus, smaller losses are expected during the transition intervals, resulting in a more efficient charge pump. By operating the capacitor in the inversion region, efficiency improvements are expected when the opening and closing of switches results in high frequency changes in the voltage across the capacitor. The use of a MOSCAP or similar capacitor which has a capacitance which varies with frequency allows for such efficiency improvements, in comparison to other types of capacitors which have high switching losses associated with fast charging and discharging. Thus, the use of a MOSCAP or similar capacitor as a flying capacitor can reduce switching losses because, while fast charging, it presents a lower capacitance. For example, the capacitance at high frequency is typically about one-half to one-third the capacitance at low frequency. Thus, switching losses can be reduced proportionately when the reduced capacitance is experienced.

Moreover, in conventional charge pumps, switching losses cause the efficiency level to vary sharply depending on the relative levels of the input and output voltages. For example, the efficiency can range between 50% and 90% for some conventional charge pumps. With an anticipated twofold or threefold reduction in switching losses, the worst case efficiency of a charge pump as described herein might be around 75% instead of 50%.

This mode of operation resembles that of a CCD (charge coupled device) such as commonly used as image sensors in cameras. A MOS capacitor behaves like a potential valley, able to collect charged particles without being associated with the usual restrictions on voltage derivative. In fact, in CCD devices, the charge transfer process is accomplished repeatedly without a noticeable loss of efficiency.

Capacitance depends on the area of the capacitor, while the time constant is directly related to MOSCAP length. Clock frequency of the switching waveform and capacitor dimensions should be adjusted in concert to fully utilize the phenomenon of different capacitances at different frequencies to achieve maximum efficiency. Further, the relationship between transition and settling times of the switching waveform should be considered. Transition times should be short enough to utilize a small capacitance, and settling times should be long enough to utilize a large capacitance. The transition time may have an optimum between a small value which is set by technology limitations and a longer value which is still sufficiently short to utilize a reduced capacitance, but not unnecessarily short beyond the point at which capacitance is not further reduced. The settling time should be sufficiently long to allow the capacitor to accumulate and discharge a sufficient amount of charge, e.g., to provide a sufficient throughput. If the settling time is too long, the pumping rate and throughput will be too small. An optimum value can be set based on testing, computer simulations and/or theoretical calculations.

The overall switching period should be short enough to provide sufficient current to the output (proportional to the switching frequency). The durations of the transition intervals are important since it takes a finite time to open or close a real switch. Moreover, the capacitor cannot charge or discharge instantly because this would produce an infinite current spike, since I=C×dV/dt. During switch closure, the capacitor is gradually charged or discharged to the voltage of the source. During charging, a finite current spike occurs when the switch is partially closed, and there is a non-zero voltage across the switch. This causes a spike in power dissipation. However, with a reduced capacitance during the transition interval, either a smaller current will charge the capacitor for the same charge time, or the same current will charge the capacitor faster. In either case, the dissipated power and losses will be smaller as power is based on an integration of an I×V curve.

Figure 5B:
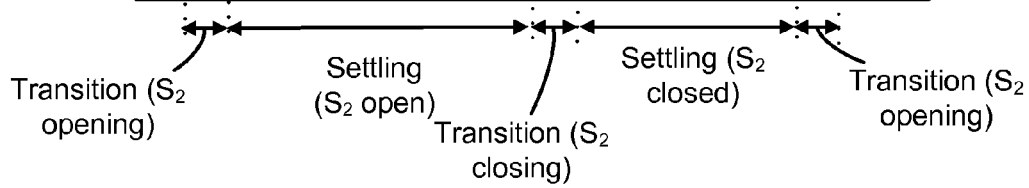
FIG. 5b depicts a control signal for switches responsible for discharging a flying capacitor in a charge pump.

FIG. 5b depicts a control signal for switches responsible for discharging a flying capacitor in a charge pump. The waveform 550 is applied to one or more switches in conjunction with the application of waveform 500 of FIG. 5a to one or more other switches. The waveform 550 is a representative waveform which is applied to one or more switches. For example, in the voltage multiplier configuration of FIG. 3b, the waveform 550 may be applied to the switches which are closed in a discharging phase, namely $S_2$ and $S_4$. Similarly, in the voltage divider configuration of FIG. 3c, the waveform 550 may be applied to $S_2$ and $S_6$, in the voltage inverter configuration of FIG. 3d, the waveform 550 may be applied to $S_3$ and $S_5$, and in the voltage follower configuration of FIG. 3e, the waveform 550 may be applied to $S_2$.

In this example, the waveform 550 is discussed in connection with its control of $S_2$, although it will be understood that it can be applied to other switches, additionally or alternatively, depending on the particular charge pump configuration. Referring still to FIG. 5b, the charge phase which extends between t1 and t4 includes a settling interval between t1 and t4 in which $S_2$ remains open (non-conductive). Prior to this, a prior transition interval between t0 and t1 is depicted in which $S_2$ transitions to being open. In a transition interval between t4 and t5, $S_2$ transitions to being closed (conductive). In a settling interval between t5 and t6, $S_2$ remains closed and the capacitor is discharged. The capacitor may or may not reach a fully discharged state at t6. For example, the capacitor may be mostly discharged, e.g., have a charge of less than a fully discharged steady state value ($V_{DISCHARGE}$) plus less than about 50% of a difference between a fully charged steady state value ($V_{CHARGE}$) and $V_{DISCHARGE}$, or almost fully discharged, e.g., have a charge of less than: $V_{DISCHARGE}$ plus less than about 10-30% of $V_{CHARGE}-V_{DISCHARGE}$. In another transition interval between t6 and t7, $S_2$ transitions from being closed to being open.

Note that the drawings are not necessarily to scale. Also, the durations of the different transition intervals can vary from one another, as can the durations of the different settling intervals. Further, while two control signals are provided in FIGS. 5a and 5b for respective switches, the principles discussed can be extrapolated to other control schemes which employ additional control signals for additional switches. Essentially any type of regulation and control may be used which takes advantage of a reduced capacitance which can be achieved for some intervals of a switching period while a capacitor is operated in an inversion region. Moreover, any two consecutive switching periods may have an overlap or be delayed, or have different durations.

Figure 6A:
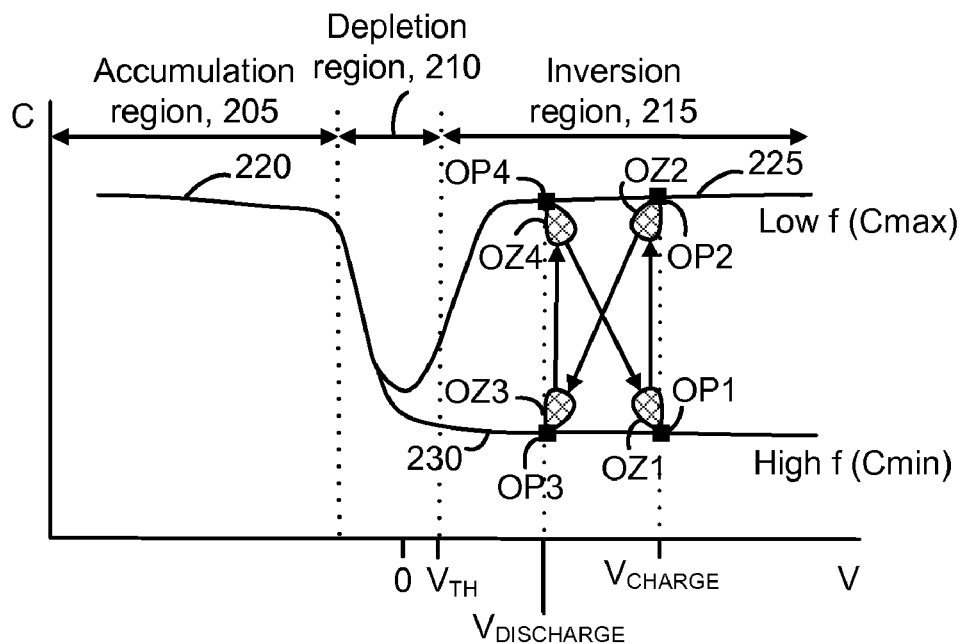
FIG. 6a depicts operating points of a charge pump on a capacitance versus voltage curve for a p-type MOS capacitor.

FIG. 6a depicts operating points of a charge pump on a capacitance versus voltage curve for a p-type MOS capacitor. During each interval of a switching period, the one or more capacitors of the charge pump operate at different operating points on the capacitance-voltage curve. FIG. 6a repeats the chart of FIG. 2a while adding anticipated operating points OP1, OP2, OP3 and OP4, associated operating zones OZ1, OZ2, OZ3 and OZ4, respectively, and transitions between the operating points and zones, which are represented by arrows. $V_{TH}$ denotes the threshold voltage of the capacitor, $V_{CHARGE}$ denotes the charge phase steady state voltage, or the final charge phase voltage which is reached, and $V_{DISCHARGE}$ denotes the discharge phase steady state voltage, or the final discharge phase voltage which is reached.

Further, as mentioned, each operating point is part of a respective operating zone which includes nearby operating points. For example, operating points OP1, OP2, OP3 and OP4 are associated with operating zones OZ1, OZ2, OZ3 and OZ4, respectively. Each operating zone may span a range of voltages and capacitances. For instance, the operating zones may each span a voltage range of about 5-15% of $V_{CHARGE}-V_{DISCHARGE}$, and a capacitance range of about 5-15% of Cmax-Cmin. Cmax denotes a maximum capacitance and Cmin denotes a minimum capacitance. These values can vary at different voltages.

During the transition interval t1-t2 of the charge phase (see also FIG. 5a), the capacitor is quickly charged to $V_{CHARGE}$. The transition interval is relatively short, corresponding to a high frequency change in the voltage across the capacitor, so that the capacitor is at or near (e.g., within about 0-10% or about 0-20%) Cmin at t2, corresponding to OP1 or OZ1. During the settling interval t2-t3, the capacitor is under almost a constant voltage, $V_{CHARGE}$. However, since the settling interval is longer than the transition interval, corresponding to a low frequency change in the voltage across the capacitor, the capacitance gradually increases toward Cmax. Thus, the operating point moves to OP2 or OZ2 at t3. During the transition interval t3-t4, the switch S1 is being opened and the capacitor retains the charge and remains in OP2 or OZ2. During the transition interval t4-t5, the capacitor is quickly discharged to $V_{DISCHARGE}$. The transition interval is relatively short, corresponding to a high frequency change in the voltage across the capacitor, so that the capacitor is at or near Cmin at t5, corresponding to OP3 or OZ3. During the settling interval t5-t6, the capacitor is under almost a constant voltage $V_{DISCHARGE}$. Since the settling interval corresponds to a low frequency change in the voltage across the capacitor, the capacitance gradually increases toward Cmax. Thus, the operating point moves to OP4 or OZ4 at t6. During the transition interval t6-t7, the switch S2 is being opened and the capacitor retains the charge and remains in OP4 or OZ4. In the next switching period, during the transition interval t7-t8, the operating point quickly moves from OP4 or OZ4 to OP1 or OZ1, and operation starts again at OP1 or OZ1.

Example $V_{CHARGE}$ and $V_{DISCHARGE}$ values for different charge pump configurations, assuming one stage and one flying capacitor, can be provided as follows. For a multiplier, $V_{CHARGE}=V_{IN}$, $V_{DISCHARGE}=V_{OUT}-V_{IN}$, and a useful range of $V_{OUT}$ is: $V_{IN}<V_{OUT}<2\times V_{IN}$. For a divider, $V_{CHARGE}=V_{IN}-V_{OUT}$, $V_{DISCHARGE}=V_{OUT}$, and a useful range of $V_{OUT}$ is: $0<V_{OUT}<V_{IN}/2$. For an inverter, $V_{CHARGE}=V_{IN}$, $V_{DISCHARGE}=-V_{OUT}$, and a useful range of $V_{OUT}$ is: $-V_{IN}<V_{OUT}<0$. For a follower, $V_{CHARGE}=V_{IN}$, $V_{DISCHARGE}=V_{OUT}$, and a useful range of $V_{OUT}$ is: $0<V_{OUT}<V_{IN}$.

Note that it is also possible to adjust the operating points of the capacitor adaptively based on a changed operating condition of the charge pump. For example, a voltage multiplier may change from providing a 2× output to a follower providing a 1× output. In this case, the regulation and control circuitry can control the switches to change factors such as the durations of the transition interval, settling interval and switching period. For example, for different $V_{IN}/V_{OUT}$ ratios, the voltage change on the capacitor will be different, charge transfer will be different, and therefore transition and settling times can be adjusted for maximum efficiency.

Figure 6B:
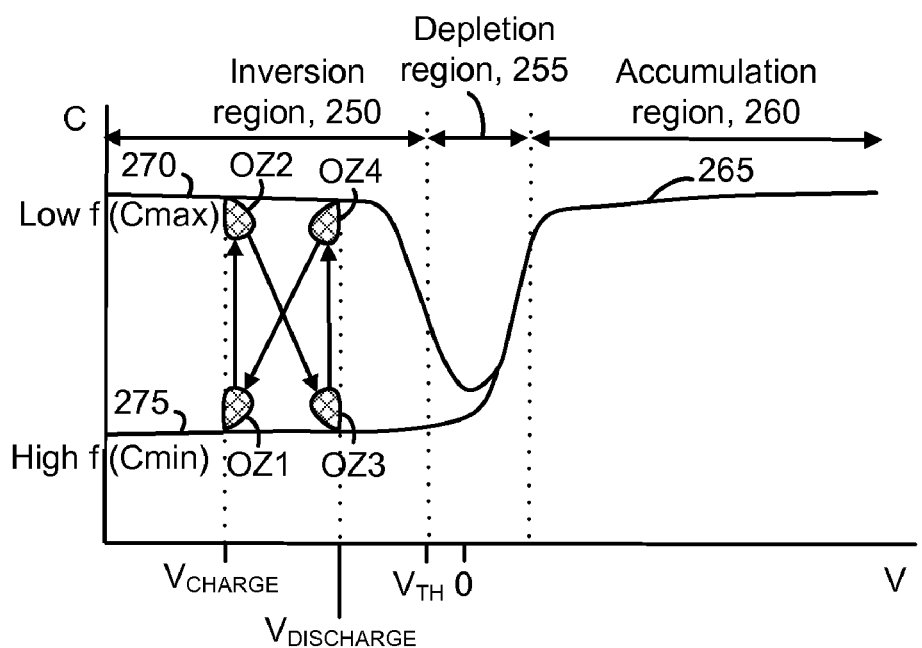
FIG. 6b depicts operating points of a charge pump on a capacitance versus voltage curve for an n-type MOS capacitor.

FIG. 6b depicts operating points of a charge pump on a capacitance versus voltage curve for an n-type MOS capacitor. FIG. 6b is essentially a mirror image of FIG. 6a, but for an n-type MOS capacitor instead of a p-type MOS capacitor. FIG. 6b repeats the chart of FIG. 2b while adding anticipated operating zones OZ1, OZ2, OZP3 and OZ4 and transitions between the operating points or zones, which are represented by arrows. $V_{TH}$, $V_{CHARGE}$ and $V_{DISCHARGE}$ are less than 0 V in this case. Operating points such as provided in FIG. 6a are not specifically depicted.

During a transition interval of the charge phase, the capacitor is quickly charged to $V_{CHARGE}$. The capacitor is at or near Cmin at OP1 or OZ1. During a following settling interval, the capacitor is under almost a constant voltage, $V_{CHARGE}$. However, since the settling interval is longer than the transition interval, corresponding to a low frequency change in the voltage across the capacitor, the capacitance gradually increases toward Cmax. Thus, the operating point moves to OP2 or OZ2. During a following transition interval, the capacitor is quickly discharged to $V_{DISCHARGE}$. The transition interval is relatively short, corresponding to a high frequency change in the voltage across the capacitor, so that the capacitor is at or near Cmin at t3, corresponding to OP3 or OZ3. During the following settling interval, the capacitor is under almost a constant voltage $V_{DISCHARGE}$. Since the settling interval corresponds to a low frequency change in the voltage across the capacitor, the capacitance gradually increases toward Cmax. Thus, the operating point moves to OP4 or OZ4. In the next switching period, the operating point quickly moves from OP4 or OZ4 to OP1 or OZ1, and operation starts again at OP1 or OZ1. Example $V_{CHARGE}$ and $V_{DISCHARGE}$ values for different charge pump configurations can be provided as discussed previously.

Figure 6C:
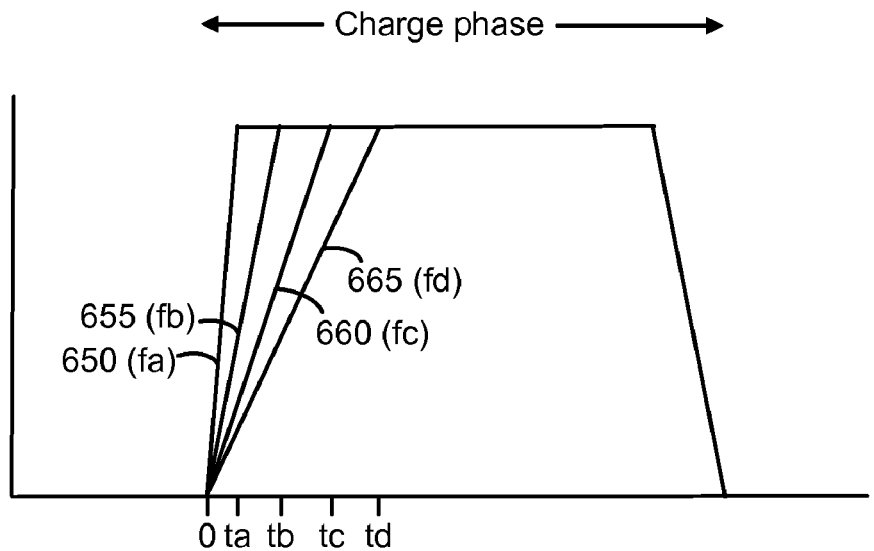
FIG. 6c depicts switching control signals with different frequencies.

FIG. 6c depicts switching control signals with different frequencies. The switching control signal can change at different rates during the transition intervals, such as the transition interval between t1-t2 in FIG. 5a during the charge phase. The slew rate or the frequency of the control signal in the transition interval can be adjusted to operate the capacitor in a desired operating zone. Waveforms 650, 655, 660 and 665 have respective frequencies of fa, fb, fc and fd, where fa>fb>fc>fd, and respective transition durations of ta, tb, tc and td, respectively, where fa~1/ta, fb~1/tb, fc~1/tc and fd~1/td (where "~" denotes "proportional to").

Figure 6D:
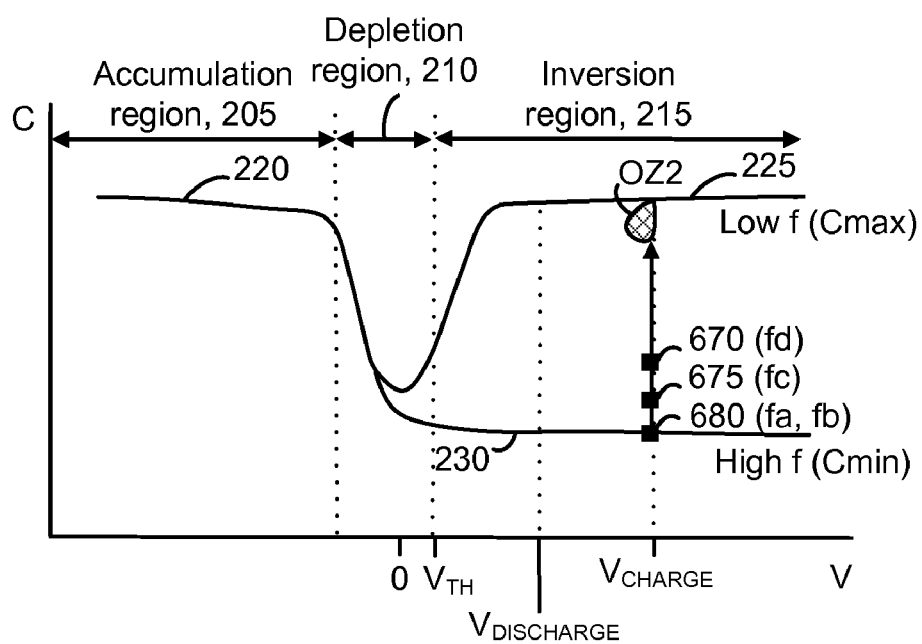
FIG. 6d depicts operating points of a charge pump on a capacitance versus voltage curve for the switching control signals of FIG. 6c.

FIG. 6d depicts operating points of a charge pump on a capacitance versus voltage curve for the switching control signals of FIG. 6c. Operating point 680 is reached when waveforms 650 and 655 are applied, operating point 675 is reached when waveform 660 is applied, and operating point 670 is reached when waveform 665 is applied. Note that when the waveform frequency is sufficiently high, e.g., above fb, Cmin is reached. Any higher frequency is not necessary and will result in increased losses in operating the switch. Thus, the frequency of the control signal in the transition interval can be set to be no higher than is necessary to operate the capacitor at the operating point 680 at Cmin, or in an associated operating zone as close as possible to Cmin. The optimum control signal can be selected based on testing, computer simulations and/or theoretical calculations for a specific application.

Figure 7:
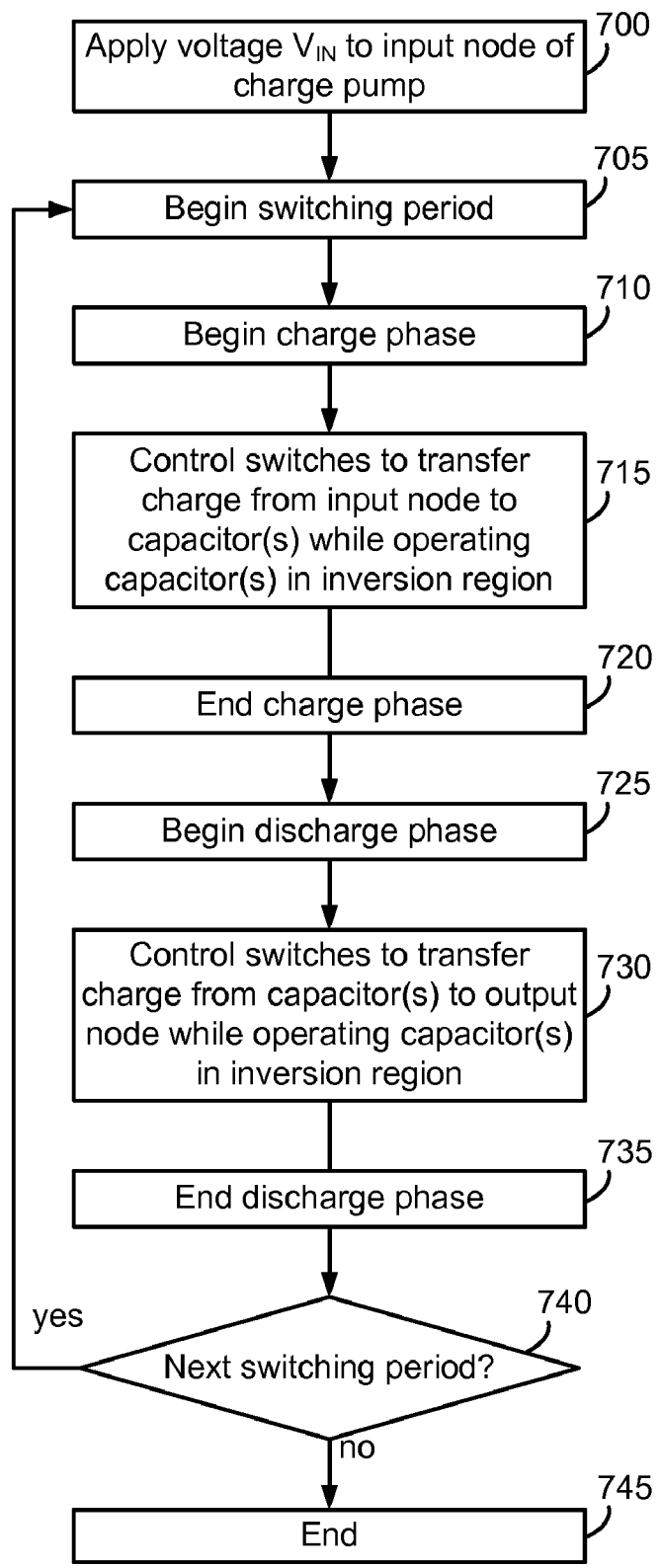
FIG. 7 depicts a method for operating a charge pump.

FIG. 7 depicts a method for operating a charge pump. Step 700 includes applying an input voltage $V_{IN}$ to the input node of a charge pump. A switching period, such as discussed in connection with FIGS. 5a and 5b, begins at step 705. A charge phase begins at step 710. Step 715 includes controlling switches in the charge pump to transfer charge from the input node to one or more capacitors while operating the one or more capacitors in the inversion region. The charge phase ends at step 720. A discharge phase begins at step 725. Step 730 includes controlling switches in the charge pump to transfer charge from the one or more capacitors to the output node while operating the one or more capacitors in the inversion region. The discharge phase ends at step 735. The process repeats starting at step 705 if there is a next switching period at decision step 740. Otherwise, the process ends at step 745.

Figure 8:
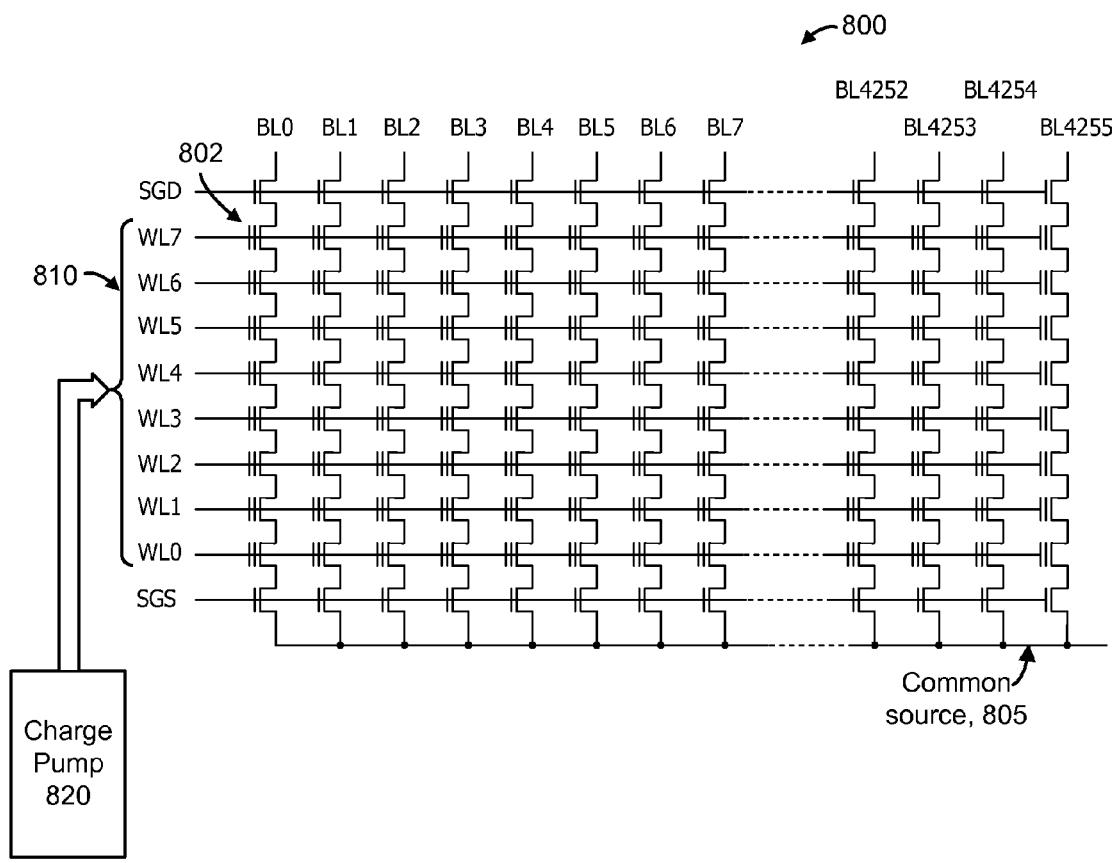
FIG. 8 depicts a block of storage elements.

FIG. 8 depicts a block of storage elements. As mentioned at the outset, a charge pump provides an output voltage which is different from a supply voltage. In one example application, a charge pump 820 is used to provide voltages at different levels during erase, program or read operations in a non-volatile memory device such as a NAND flash EEPROM. In such a device, a block 800 includes a number of storage elements which communicate with respective word lines WL0-WL7 (810), respective bit lines BL0-B4255, and a common source line 805. An example storage element 802 is depicted. In the example provided, eight storage elements are connected in series to form a NAND string, and there are eight data word lines WL0 through WL7. Moreover, one terminal of each NAND string is connected to a corresponding bit line via a drain select gate (connected to select gate drain line SGD), and another terminal is connected to a common source 805 via a source select gate (connected to select gate source line SGS). Thus, the common source 805 is coupled to each NAND string. The block 800 is typically one of many such blocks in a memory array.

In an erase operation, a high voltage such as 20 V is applied to a substrate on which the NAND string is formed to remove charge from the storage elements. During a programming operation, a voltage in the range of 12-21 V is applied to a selected word line. In one approach, step-wise increasing program pulses are applied until a storage element is verified to have reached an intended state. Moreover, pass voltages at a lower level may be applied concurrently to the unselected word lines. In read and verify operations, the select gates (SGD and SGS) are connected to a voltage in a range of 2.5 to 4.5 V and the unselected word lines are raised to a read pass voltage, $V_{READ}$, (typically a voltage in the range of 4.5 to 6 V) to make the transistors operate as pass gates. The selected word line is connected to a voltage, a level of which is specified for each read and verify operation, to determine whether a $V_{TH}$ of the concerned storage element is above or below such level.

In practice, the output of a charge pump may be used to provide different voltages concurrently to different word lines or groups of word lines. It is also possible to use multiple charge pumps to supply different word line voltages. Similarly, the output from a charge pump can be provided to a bit line or other location as needed in the memory device. The use of a charge pump as described herein can provide significant efficiency benefits compared to other charge pumps such as a metal capacitor based or without using MOSCAP capacitance versus frequency dependence.

Figure 9:
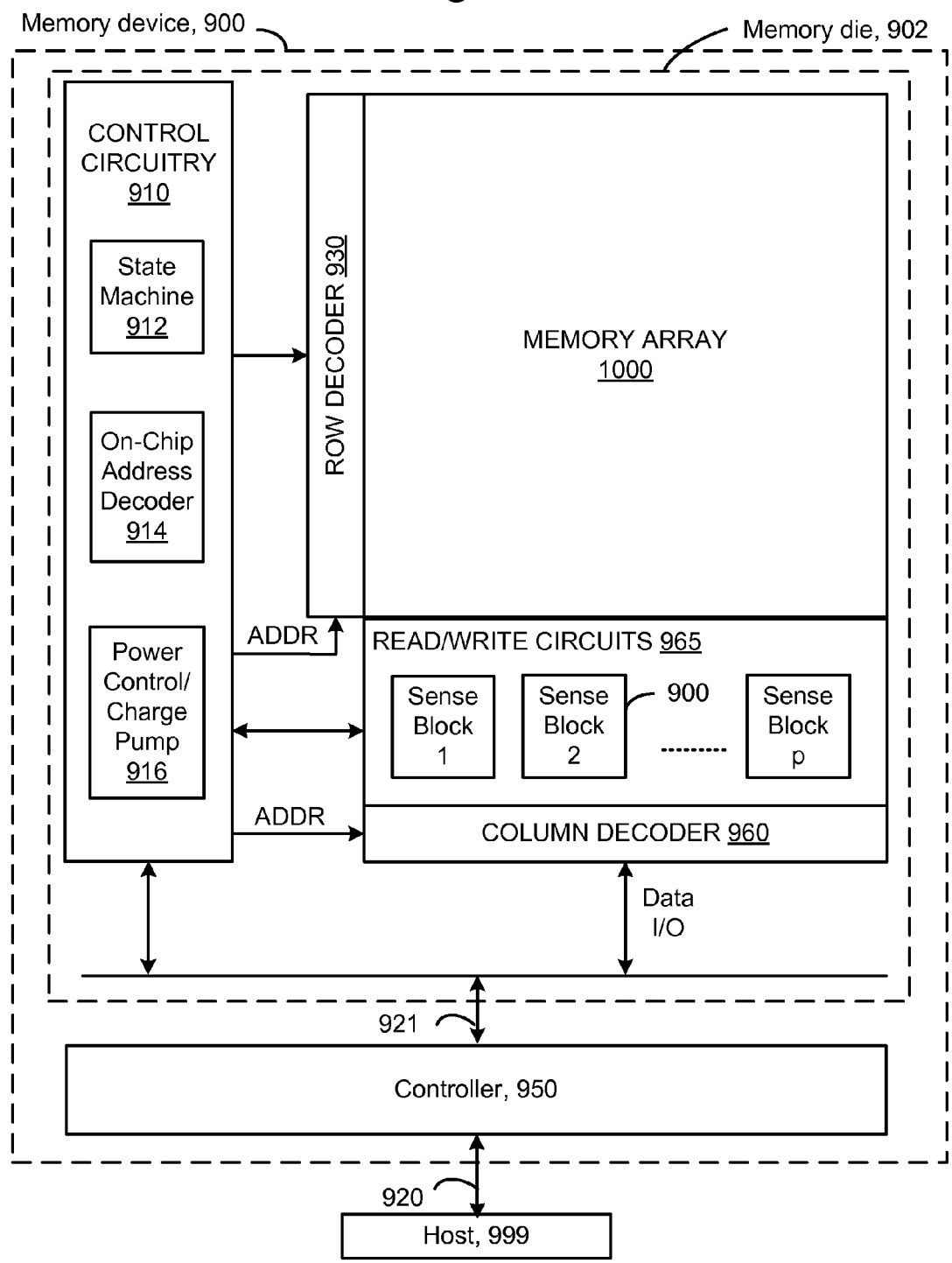
FIG. 9 is a block diagram of a non-volatile memory system using single row/column decoders and read/write circuits.

FIG. 9 is a block diagram of a non-volatile memory system using single row/column decoders and read/write circuits. The system may include many blocks of storage elements such as provided in FIG. 8. A memory device 900 has read/write circuits for reading and programming a page of storage elements in parallel, and may include one or more memory die 902. Memory die 902 includes a two-dimensional array of storage elements 1000, which may include several of the blocks 800 of FIG. 8, control circuitry 910, and read/write circuits 965. In some embodiments, the array of storage elements can be three dimensional. The memory array 1000 is addressable by word lines via a row decoder 930 and by bit lines via a column decoder 960. The read/write circuits 965 include multiple sense blocks 900 and allow a page of storage elements to be read or programmed in parallel. Typically a controller 950 is included in the same memory device 900 (e.g., a removable storage card) as the one or more memory die 902. Commands and data are transferred between the host 999 and controller 950 via lines 920 and between the controller and the one or more memory die 902 via lines 921.

The control circuitry 910 cooperates with the read/write circuits 965 to perform operations on the memory array 1000. The control circuitry 910 includes a state machine 912, an on-chip address decoder 914 and a power control/charge pump module 916. The power control/charge pump module 916 is efficiently operated in an inversion region to provide an output voltage $V_{OUT}$ as discussed herein. In an example embodiment, the power control/charge pump module 916 is a step-down regulated charge pump for supplying a logic voltage, e.g., 1.2 V logic, in a non-volatile storage product. In another example embodiment, the power control/charge pump module 916 is a step-up regulated charge pump which supports a 1.8 V host in a non-volatile storage product.

The state machine 912 provides chip-level control of memory operations. For example, the state machine may be configured to perform read and verify processes. The on-chip address decoder 914 provides an address interface between that used by the host or a memory controller to the hardware address used by the decoders 930 and 960. The power control/charge pump module 916 controls the power and voltages supplied to the word lines and bit lines during memory operations.

In some implementations, some of the components of FIG. 9 can be combined. In various designs, one or more of the components (alone or in combination), other than storage element array 1000, can be thought of as a managing or control circuit. For example, one or more managing or control circuits may include any one of, or a combination of, control circuitry 910, state machine 912, decoders 914/960, power control 916, sense blocks 900, read/write circuits 965, controller 950, host controller 999, and so forth.

The data stored in the memory array is read out by the column decoder 960 and output to external I/O lines via the data I/O line and a data input/output buffer 952. Program data to be stored in the memory array is input to the data input/output buffer 952 via the external I/O lines. Command data for controlling the memory device are input to the controller 950. The command data informs the flash memory of what operation is requested. The input command is transferred to the control circuitry 910. The state machine 912 can output a status of the memory device such as READY/BUSY or PASS/FAIL. When the memory device is busy, it cannot receive new read or write commands.

In another possible configuration, a non-volatile memory system can use dual row/column decoders and read/write circuits. In this case, access to the memory array by the various peripheral circuits is implemented in a symmetric fashion, on opposite sides of the array, so that the densities of access lines and circuitry on each side are reduced by half.

Note that the one or more capacitors in the charge pump may be on-chip (internal) or off-chip (external). For example, in an internal configuration, the capacitor may be formed on a silicon substrate which serves as the lower conductive layer of the capacitor. Fully integrating the charge pump on the chip also saves the cost of external components and assembly, along with a number of dedicated pads.

The foregoing detailed description of the invention has been presented for purposes of illustration and description. It is not intended to be exhaustive or to limit the invention to the precise form disclosed. Many modifications and variations are possible in light of the above teaching. The described embodiments were chosen to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method for operating a charge pump, comprising:
  applying a voltage to an input node of the charge pump, the charge pump comprising at least one flying capacitor comprising an insulating layer between first and second conductive layers, the at least one flying capacitor having a threshold voltage greater than 0 V; and
  in a switching period which includes a charge phase followed by a discharge phase, alternately transferring charge from the input node to the at least one flying capacitor in the charge phase in which a bias voltage across the at least one flying capacitor reaches a charge level, and from the at least one flying capacitor to an output node of the charge pump in the discharge phase in which the bias voltage across the at least one flying capacitor reaches a discharge level, the alternately transferring charge includes, throughout the switching period: keeping the bias voltage across the at least one flying capacitor above the threshold voltage so that the at least one flying capacitor operates in an inversion region; wherein:
  the charge phase includes, successively, a first transition interval, a first settling interval and a second transition interval, the first settling interval is longer than the first and second transition intervals;
  the discharge phase includes a third transition interval, following the second transition interval;
  in the first transition interval: a control signal of a first switch is ramped to cause the first switch to transition from a non-conductive state to a conductive state, thereby transferring charge from the input node to the at least one flying capacitor, so that there is a relatively high frequency increase in the bias voltage across the at least one flying capacitor, as a result of which the at least one flying capacitor transitions from a first operating zone (0Z4) to a second operating zone (0Z1);
  in the first settling interval: the control signal of the first switch is fixed to keep the first switch in the conductive state, so that there is a relatively low frequency change in the bias voltage across the at least one flying capacitor, as a result of which the at least one flying capacitor transitions from the second operating zone (0Z1) to a third operating zone (0Z2; and
  in the second transition interval: the control signal of the first switch is ramped to cause the first switch to transition from the conductive state to the non-conductive state;

in the third transition interval: a control signal of a second switch is ramped to cause the second switch to transition from a non-conductive state to a conductive state, thereby transferring charge from the at least one flying capacitor to the output node, so that there is a relatively high frequency decrease in the bias voltage across the at least one flying capacitor, as a result of which the at least one flying capacitor transitions from the third operating zone (0Z2) to a fourth operating zone (0Z3;

in the first operating zone (0Z4), the at least one flying capacitor is at the discharge level and a maximum capacitance;

in the second operating zone (0Z1), the at least one flying capacitor is at the charge level and a minimum capacitance;

in the third operating zone (0Z2), the at least one flying capacitor is at the charge level and the maximum capacitance; and in the fourth operating zone (0Z3), the at least one flying capacitor is at the discharge level and the minimum capacitance.

2. The method of claim 1, wherein:

the at least one flying capacitor undergoes repeated charging and discharging phases, a duration of each charging phase is sufficient to allow a charge of the at least one flying capacitor to rise above a fully discharged steady state value by more than 50% of a difference between a fully charged steady state value and the fully discharged steady state value, and a duration of each discharging phase is sufficient to allow the charge of the at least one flying capacitor to fall below the fully charged steady state value by more than 50% of the difference between the fully charged steady state value and the fully discharged steady state value.

3. The method of claim 1, wherein:

the charge pump is operated as at least one of: a voltage multiplier, a voltage divider, a voltage inverter and a voltage follower.

4. A method for operating a charge pump, comprising:

applying a voltage to an input node of the charge pump, the charge pump comprising at least one flying capacitor comprising an insulating layer between first and second conductive layers, the at least one flying capacitor comprises an n-type MOS capacitor having a threshold voltage less than 0 V; and in a switching period which includes a charge phase followed by a discharge phase, alternately transferring charge from the input node to the at least one flying capacitor in the charge phase in which a bias voltage across the at least one flying capacitor reaches a charge level, and from the at least one flying capacitor to an output node of the charge pump in the discharge phase in which the bias voltage across the at least one flying capacitor reaches a discharge level, where, the alternately transferring charge includes, throughout the switching period: keeping the bias voltage across the at least one flying capacitor below the threshold voltage so that the at least one flying capacitor operates in an inversion region; wherein:

the charge phase includes, successively, a first transition interval, a first settling interval and a second transition interval, the first settling interval is longer than the first and second transition intervals;

the discharge phase includes a third transition interval, following the second transition interval;

in the first transition interval: a control signal of a first switch is ramped to cause the first switch to transition from a non-conductive state to a conductive state, thereby transferring charge from the input node to the at least one flying capacitor, so that there is a relatively high frequency increase in the bias voltage across the at least one flying capacitor, as a result of which the at least one flying capacitor transitions from a first operating zone (0Z4) to a second operating zone (0Z1);

in the first settling interval: the control signal of the first switch is fixed to keep the first switch in the conductive state, so that there is a relatively low frequency change in the bias voltage across the at least one flying capacitor, as a result of which the at least one flying capacitor transitions from the second operating zone (0Z1) to a third operating zone (0Z2; and in the second transition interval: the control signal of the first switch is ramped to cause the first switch to transition from the conductive state to the non-conductive state;

in the third transition interval: a control signal of a second switch is ramped to cause the second switch to transition from a non-conductive state to a conductive state, thereby transferring charge from the at least one flying capacitor to the output node, so that there is a relatively high frequency decrease in the bias voltage across the at least one flying capacitor, as a result of which the at least one flying capacitor transitions from the third operating zone (0Z2) to a fourth operating zone (0Z3;

in the first operating zone (0Z4), the at least one flying capacitor is at the discharge level and a maximum capacitance;

in the second operating zone (0Z1), the at least one flying capacitor is at the charge level and a minimum capacitance;

in the third operating zone (0Z2), the at least one flying capacitor is at the charge level and the maximum capacitance; and in the fourth operating zone (0Z3), the at least one flying capacitor is at the discharge level and the minimum capacitance.

5. The method of claim 4, wherein:

the voltage applied to the input node is fixed.

6. A charge pump, comprising:

an input node;

an output node;

a capacitor which operates in an inversion region, where the capacitor includes an insulating layer between a first conductive layer which is a gate and a second conductive layer which is a semiconductor bulk terminal;

at least a first set of switches coupled to the first conductive layer;

at least a second set of switches coupled to the second conductive layer; and a control circuit which applies control signals to the at least a first set of switches and the at least a second set of switches in a switching period which includes a charge phase followed by a discharge phase, to alternately transfer charge from the input node to the capacitor in a charge phase in which the capacitor reaches a charge level, and from the capacitor to the output node in a discharge phase in which the capacitor reaches a discharge level, where, throughout the switching period: a bias voltage across the capacitor is kept between the charge level and the discharge level so that the capacitor operates in the inversion region, and the at least one flying capacitor operates in first, second, third and fourth operating zones, the at least one flying capacitor is at the discharge level and a maximum capacitance in the first operating zone (0Z4), the at least one flying capacitor is at the charge level and a minimum capacitance in the second operating zone (0Z1), the at least one flying capacitor is at the charge level and the maximum capacitance in the third operating zone (0Z2), and the at least one flying capacitor is at the discharge level and the minimum capacitance in the fourth operating zone (0Z3).

7. The charge pump of claim 6, wherein:
the capacitor undergoes repeated charging and discharging phases, a duration of each charging phase is sufficient to allow a charge of the capacitor to rise above a fully discharged steady state value by more than 50% of a difference between a fully charged steady state value and the fully discharged steady state value, and a duration of each discharging phase is sufficient to allow the charge of the capacitor to fall below the fully charged steady state value by more than 50% of the difference between the fully charged steady state value and the fully discharged steady state value.

8. The charge pump of claim 6, wherein:
the capacitor is a p-type MOS capacitor; and
the control circuit biases the capacitor at a bias voltage which is greater than a threshold voltage of the capacitor.

9. The charge pump of claim 6, wherein:
the capacitor is an n-type MOS capacitor; and
the control circuit biases the capacitor at a bias voltage which is less than a threshold voltage of the capacitor.

10. The method of claim 1, wherein:
the voltage applied to the input node is fixed.

11. The method of claim 1, wherein:
the charge level is greater than the discharge level.

12. The method of claim 4, wherein:
the charge level is less than the discharge level.

13. The charge pump of claim 6, wherein:
a voltage applied to the input node is fixed.

14. The charge pump of claim 6, wherein:
the charge level is greater than the discharge level.

15. The charge pump of claim 6, wherein:
the charge level is less than the discharge level.

16. The method of claim 1, wherein:
the control signal of the first switch is ramped to cause the first switch to transition from the conductive state to the non-conductive state in the second transition interval.

17. The method of claim 1, wherein:
the discharge phase includes a second settling interval, after the third transition interval, the second settling interval is longer than the third transition interval; and
the control signal of the second switch is fixed to keep the second switch in the conductive state in the second settling interval, so that there is a relatively low frequency change in the bias voltage across the at least one flying capacitor, as a result of which the at least one flying capacitor transitions from the fourth operating zone (0Z3) to the first operating zone (0Z4).

18. The method of claim 1, wherein:
the control signal of the second switch is fixed to keep the second switch in the non-conductive state in the first settling interval.

19. The method of claim 4, wherein:
the control signal of the first switch is ramped to cause the first switch to transition from the conductive state to the non-conductive state in the second transition interval.

20. The method of claim 4, wherein:
the discharge phase includes a second settling interval, after the third transition interval, the second settling interval is longer than the third transition interval; and
the control signal of the second switch is fixed to keep the second switch in the conductive state in the second settling interval, so that there is a relatively low frequency change in the bias voltage across the at least one flying capacitor, as a result of which the at least one flying capacitor transitions from the fourth operating zone (0Z3) to the first operating zone (0Z4).

21. The method of claim 4, wherein:
the control signal of the second switch is fixed to keep the second switch in the non-conductive state in the first settling interval.

* * * * *